US012790263B2

(12) United States Patent
Nam et al.

(10) Patent No.: US 12,790,263 B2
(45) Date of Patent: Nov. 10, 2026

(54) WINDOW MANUFACTURING METHOD

(71) Applicant: Samsung Display Co., LTD., Yongin-si (KR)

(72) Inventors: Jinsu Nam, Yongin-si (KR); Yongkyu Kang, Yongin-si (KR); Seungho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 422 days.

(21) Appl. No.: 18/217,972

(22) Filed: Jul. 3, 2023

(65) Prior Publication Data

US 2024/0101470 A1 Mar. 28, 2024

(30) Foreign Application Priority Data

Sep. 28, 2022 (KR) ........................ 10-2022-0123570

(51) Int. Cl.
*C03C 21/00* (2006.01)
*C03C 23/00* (2006.01)

(52) U.S. Cl.
CPC ........ *C03C 21/002* (2013.01); *C03C 23/0055* (2013.01)

(58) Field of Classification Search
None
See application file for complete search history.

(56) References Cited

U.S. PATENT DOCUMENTS 4,872,896 A * 10/1989 LaCourse ............ C03C 21/002 65/30.14
8,776,547 B2 7/2014 Abramov et al.
9,624,128 B1 * 4/2017 Click ...................... C03C 17/06
10,273,184 B2 4/2019 Garner et al.
2007/0023971 A1 * 2/2007 Saha ....................... C04B 35/64 264/432
2009/0100872 A1 * 4/2009 Hawtof .................. C04B 37/04 65/36
2012/0216570 A1 * 8/2012 Abramov ............. C03C 21/008 65/30.14
2014/0261975 A1 * 9/2014 Sridharan ................ C03C 8/06 156/272.4
2015/0218045 A1 8/2015 Balcom et al.
2019/0218134 A1 * 7/2019 Li ......................... C03C 21/002

FOREIGN PATENT DOCUMENTS

JP 2015526383 A 9/2015
KR 102024630 B1 9/2019
KR 102230270 B1 3/2021
KR 102235722 B1 4/2021
WO WO-9526940 A1 * 10/1995 .......... C04B 35/584
WO 2013057027 A1 4/2013
WO 2014036108 A1 3/2014

* cited by examiner

*Primary Examiner* — Queenie S Dehghan
(74) *Attorney, Agent, or Firm* — CANTOR COLBURN LLP

(57) ABSTRACT

A window manufacturing method includes preparing a glass substrate including alkali ions, providing a strengthening material on a surface of the glass substrate, and strengthening the surface of the glass substrate. The strengthening the surface of the glass substrate includes irradiating the strengthening material disposed on the glass substrate with high-frequency waves, and the strengthening material includes a salt including ion exchange target ions, which are ion-exchangeable with the alkali ions included in the glass substrate, and a high-frequency reactive material.

18 Claims, 9 Drawing Sheets

WINDOW MANUFACTURING METHOD

This application claims priority to Korean Patent Application No. 10-2022-0123570, filed on Sep. 28, 2022, and all the benefits accruing therefrom under 35 U.S.C. § 119, the content of which in its entirety is herein incorporated by reference.

BACKGROUND

1. Field

The disclosure herein relates to a window manufacturing method, and more particularly, to a window manufacturing method including chemically strengthening a glass substrate included in a window.

2. Description of the Related Art

To provide a user with image information, a display device is used in various multimedia devices such as television sets, mobile phones, tablet computers, and game consoles. A display device may include a display module, and a window.

The window included in a display device effectively transmits image information provided by the display module to the outside, and protects the display module from the outside. Research is being conducted on a method for enhancing the impact resistance of a glass substrate used for a window. For example, heat treatment, chemical treatment, etc., may be performed to improve the rigidity of the glass substrate.

SUMMARY

The disclosure provides a window manufacturing method capable of effectively chemically strengthening a glass substrate used for a window.

An embodiment of the invention provides a window manufacturing method including preparing a glass substrate including alkali ions, providing a strengthening material on a surface of the glass substrate, and strengthening the surface of the glass substrate, where the strengthening the surface of the glass substrate includes irradiating the strengthening material disposed on the glass substrate with high-frequency waves, and the strengthening material includes a salt including ion exchange target ions, which are ion-exchangeable with the alkali ions included in the glass substrate, and a high-frequency reactive material.

In an embodiment, the strengthening the surface of the glass substrate may further include ion-exchanging the alkali ions and the ion exchange target ions with each other.

In an embodiment, the irradiating the strengthening material with high-frequency waves may include generating, by the high-frequency reactive material, heat in response to the high-frequency waves.

In an embodiment, the high-frequency reactive material may include high-frequency reactive ceramic.

In an embodiment, the high-frequency reactive ceramic may include at least one selected from $Al_2O_3$, $ZrO_2$, $TiO_2$, $Co_2O_3$, $MnO_2$, NiO, CuO, MgO, $SiO_2$, high-frequency reactive glass, dielectric ceramic expressed as $ABO_3$, SiC, and doped Si, where A may be at least one selected from Ca, La, Sr, Ba, and Mg, and B may be at least one selected from Zn, Al, and Ti.

In an embodiment, the high-frequency reactive ceramic may include at least one selected from SiC, and doped Si.

In an embodiment, the high-frequency reactive material may further include a high-frequency reactive polymer.

In an embodiment, the high-frequency reactive polymer may include at least one selected from acrylonitrile butadiene styrene (ABS) copolymer, acetal, epoxy, melamine, phenylformaldehyde, polycarbonate, polyester, polyamide, polyurethane, polyvinyl chloride (PVC), thermoplastic elastomer (TPE), and silicon (Si).

In an embodiment, the strengthening material may have a form of slurry, paste, or a sheet.

In an embodiment, the providing the strengthening material, and the strengthening the surface of the glass substrate may be each performed in a non-immersion manner.

In an embodiment, the window manufacturing method may further include removing the strengthening material from the glass substrate, the surface of which is strengthened.

In an embodiment, the strengthening the surface of the glass substrate may further include applying conductive heat, from an outside, to the glass substrate and the strengthening material disposed on the glass substrate, simultaneously with the irradiating the strengthening material with high-frequency waves.

In an embodiment, the window manufacturing method may further include providing a high-frequency susceptor to be adjacent to the glass substrate and the strengthening material disposed on the glass substrate, where the strengthening may further include irradiating the high-frequency susceptor with high-frequency waves, simultaneously with the irradiating the strengthening material disposed on the glass substrate with high-frequency waves, and the high-frequency susceptor may generate heat in response to the high-frequency waves radiated thereto.

In an embodiment, the window manufacturing method may further include providing a high-frequency susceptor directly on the strengthening material disposed on the glass substrate, where the strengthening may further include irradiating the high-frequency susceptor with high-frequency waves, simultaneously with the irradiating the strengthening material disposed on the glass substrate with high-frequency waves, and the high-frequency susceptor may generate heat in response to the high-frequency waves radiated thereto.

In an embodiment, the window manufacturing method may further include providing a heat-loss preventing material directly on the high-frequency susceptor.

In an embodiment of the invention, a window manufacturing method includes preparing a glass substrate, providing a strengthening material including a high-frequency reactive material on a surface of the glass substrate, and strengthening the surface of the glass substrate by irradiating the strengthening material disposed on the glass substrate with high-frequency waves.

In an embodiment, the strengthening the surface of the glass substrate may include generating, by the high-frequency reactive material, heat in response to the high-frequency waves.

In an embodiment, the high-frequency reactive material may include at least one selected from SiC and doped Si.

In an embodiment of the invention, a window manufacturing method includes preparing a glass substrate, providing a strengthening material including a high-frequency wave reaction material on a surface of the glass substrate, and strengthening the glass substrate by irradiating the strengthening material disposed on the glass substrate with high-frequency waves, where the strengthening material includes high-frequency reactive ceramic, the high-frequency reactive ceramic includes at least one selected from $Al_2O_3$, $ZrO_2$, $TiO_2$, $Co_2O_3$, $MnO_2$, NiO, CuO, MgO, $SiO_2$, high-frequency reactive glass, dielectric ceramic expressed as $ABO_3$, SiC, and doped Si, where A is at least one selected from Ca, La, Sr, Ba, and Mg, and B is at least one selected from Zn, Al, and Ti.

In an embodiment, the strengthening material may further include a high-frequency reactive polymer, and the polymer may include at least one selected from acrylonitrile butadiene styrene copolymer (ABS), acetal, epoxy, melamine, phenylformaldehyde, polycarbonate, polyester, polyamide, polyurethane, polyvinyl chloride (PVC), thermoplastic elastomer (TPE), and silicon (Si).

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
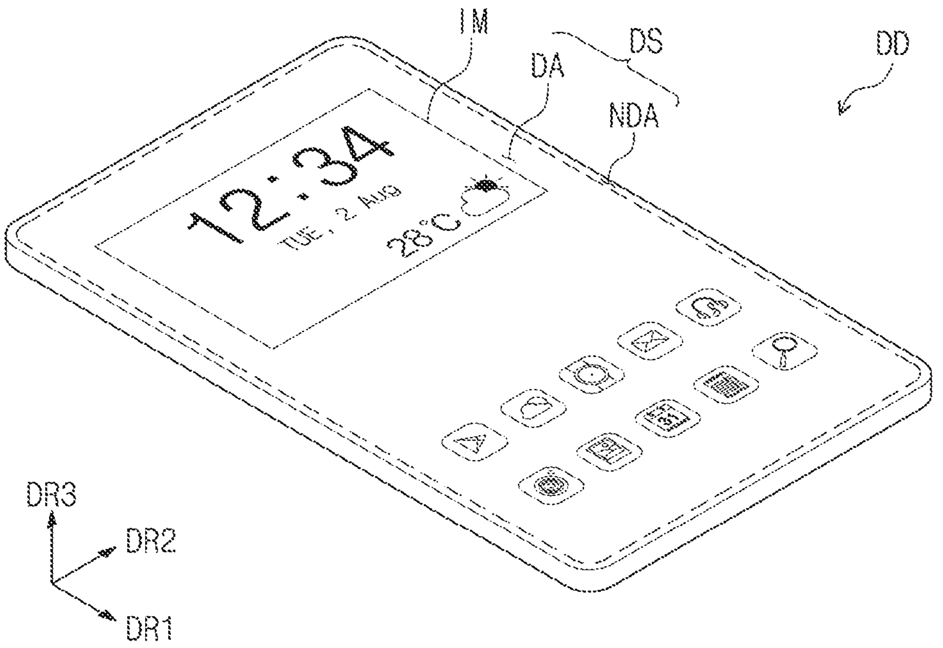
FIG. 1 is a combined perspective view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when a component (or region, layer, portion, etc.) is referred to as "on", "connected", or "coupled" to another component, it means that it is placed/connected/coupled directly on the other component or a third component can be disposed between them.

Meanwhile, in the present application, "directly disposed" may mean that there is no layer, film, region, plate, etc. added between a portion such as a layer, film, region, or plate and another portion. For example, "direct disposed" may mean placing two layers or two members without using an additional member such as an adhesive member therebetween.

The same reference numerals or symbols refer to the same elements. In addition, in the drawings, thicknesses, ratios, and dimensions of components are exaggerated for effective description of technical content.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used in this specification have the same meaning as commonly understood by one of ordinary skill in the art to which this invention belongs. In addition, terms such as terms defined in commonly used dictionaries should be interpreted as having a meaning consistent with the meaning having in the context of the related technology, and should not be interpreted as too ideal or too formal unless explicitly defined here.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a combined perspective view of a display device DD according to an embodiment of the invention.

The display device DD according to an embodiment may be a device activated in response to an electrical signal. In an embodiment, the display device DD may be a mobile phone, a tablet computer, a car navigation system, a game console, or a wearable device, for example, but an embodiment of the invention is not limited thereto. FIG. 1 illustrates an embodiment where the display device DD is a mobile phone.

In FIG. 1 and the following drawings, a first direction DR1, a second direction DR2, and a third direction DR3 are illustrated, and directions indicated by the first to third directions DR1, DR2, and DR3 described in the disclosure are relative concepts, and may thus be changed to other directions. In addition, directions directly opposite to directions indicated by the first to third directions DR1, DR2, and DR3 may also be described as the first to third directions, and the same reference numerals or symbols may be used.

Referring to FIG. 1, the display device DD according to an embodiment may include a display surface DS on a plane defined by the first direction DR1 and the second direction DR2 crossing the first direction DR1. The display device DD may provide a user with an image IM through the display surface DS. The display device DD according to an embodiment may display the image IM toward the third direction DR3 on the display surface DS parallel to each of the first direction DR1 and the second direction DR2. In the disclosure, the front surface (or upper surface) and the rear surface (or lower surface) of each component are defined with respect to a direction in which the image IM is displayed. The front surface and the rear surface may be opposed to each other in the third direction DR3, and a normal direction of each of the front surface and the rear surface may be parallel to the third direction DR3. Herein, the third direction DR3 may be a thickness direction of the display device DD.

In an embodiment, the display surface DS may include a display region DA and a non-display region NDA adjacent to the display region DA. The non-display region NDA may be a region in which the image IM is not displayed. However, an embodiment of the invention is not limited thereto, and the non-display region NDA may be omitted.

The display device DD according to an embodiment may sense an external input applied from an outside. The external input may include various forms of inputs provided from the outside of the display device DD. In an embodiment, for example, the external input may include not only a touch by a part of a body such as a user's hand, but also an external input (for example, hovering) applied to the display device DD in proximity or applied to the display device DD while being adjacent within a predetermined distance. In addition, the external input may have various forms such as force, pressure, temperature, or light.

The display device DD according to an embodiment may further include various electronic modules. In an embodiment, for example, the electronic modules may include at least one selected from a camera, a speaker, a light sensing sensor, and a heat sensing sensor. The electronic modules may sense an external subject received through the display surface DS, or may provide, to the outside, a sound signal such as voice through the display surface DS. The electronic modules may each include a plurality of components, and is not limited to any one embodiment.

Figure 2:
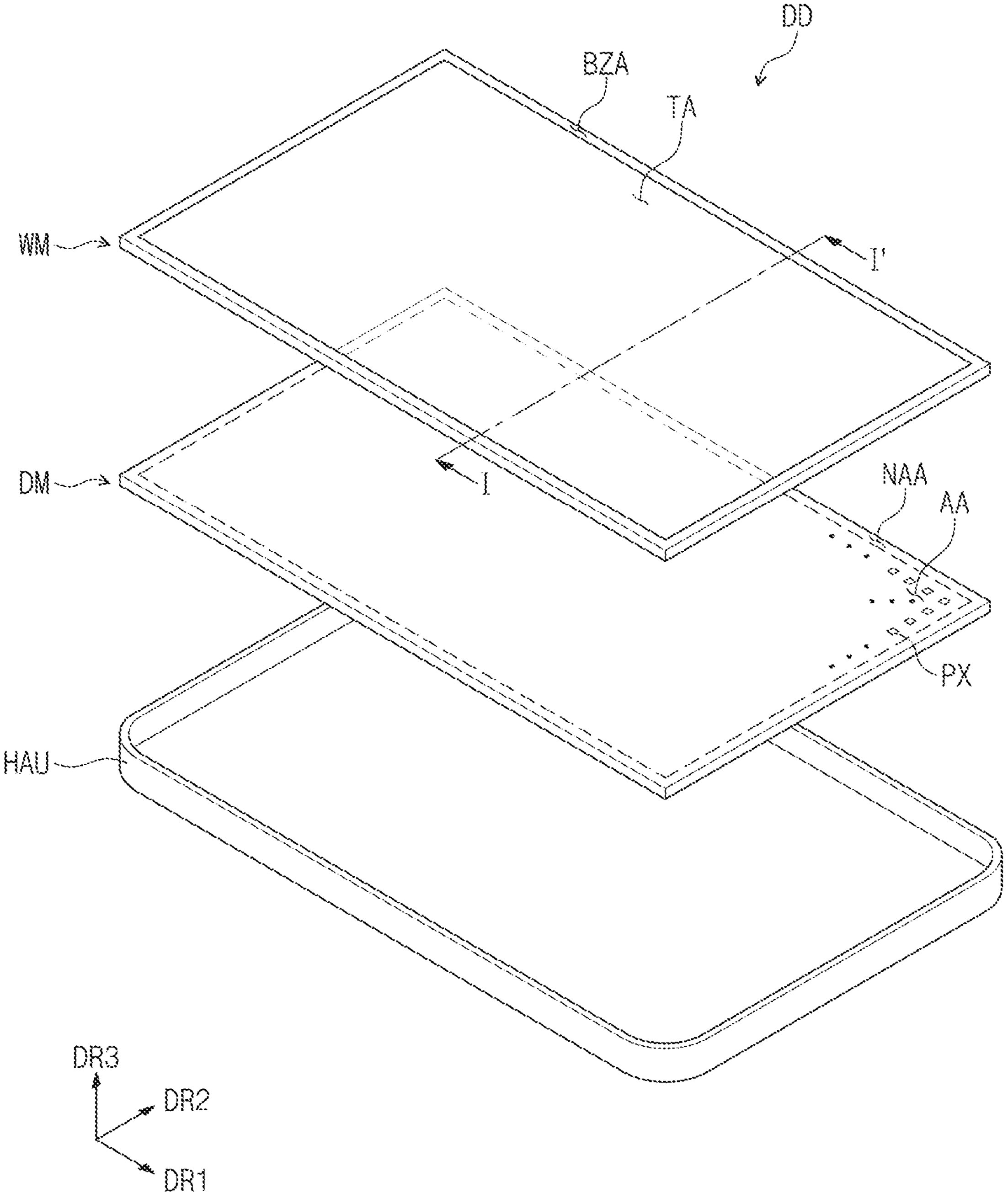
FIG. 2 is an exploded perspective view of a display device according to an embodiment of the invention.

FIG. 2 is an exploded perspective view of the display device DD according to an embodiment of the invention. Particularly, FIG. 2 illustrates an exploded perspective view of an embodiment of the display device DD shown in FIG. 1.

Referring to FIG. 2, the display device DD according to an embodiment may include a display module DM and a window WM disposed on the display module DM. The window WM may be disposed above and/or under the display module DM. FIG. 2 illustrates that the window WM is disposed on a top surface of the display module DM.

In addition, the display device DD according to an embodiment may further include an electronic module (not shown) disposed under the display module DM. In an embodiment, for example, the electronic module (not shown) may include a camera module.

In addition, although not shown, the display device DD according to an embodiment may further include an adhesive layer, and/or a polarizing film disposed between the display module DM and the window WM. In addition, although not shown, the display device DD according to an embodiment may further include a lower functional layer disposed under the display module DM.

The display device DD according to an embodiment may further include a housing HAU that accommodates the display module DM and the lower functional layer. The housing HAU may be combined with the window WM to constitute the exterior of the display device DD. The housing HAU may include a material having a relatively high rigidity. In an embodiment, for example, the housing HAU may include a plurality of frames and/or plates composed of glass, plastic, or metal. The display module DM may be accommodated in an accommodation space defined between the housing HAU and the window WM, and be protected from an external impact.

The display module DM according to an embodiment may display the image IM in response to an electrical signal, and may transmit/receive information about an external input. The display module DM may include a display panel, and a sensor layer disposed on the display panel.

The display module DM may include an active region AA and a peripheral region NAA. The active region AA may be a region for providing the image IM (see FIG. 1). A pixel PX may be disposed in the active region AA. The peripheral region NAA may be adjacent to the active region AA. The peripheral region NAA may surround the active region AA. A driving circuit, a driving line, or the like for driving the active region AA may be disposed in the peripheral region NAA.

The display module DM may include a plurality of pixels PX. The pixels PX may each display light in response to an electrical signal. The light displayed by the pixels PX may form the image IM. The pixels PX may each include a display element. In an embodiment, for example, the display element may be an organic light-emitting element, an inorganic light-emitting element, an organic-inorganic light-emitting element, a micro-light emitting diode (micro-LED), a nano-light emitting diode (nano-LED), a quantum dot light-emitting element, an electrophoretic element, an electrowetting element, or the like.

The window WM may cover an entire upper surface of the display module DM. The window WM may have a shape corresponding to the shape of the display module DM. The window WM may have flexibility so that the window WM may be deformed according to deformation of the display device DD such as folding or bending. The window WM may function to protect the display module DM from an external impact.

The window WM may include a transmission region TA and a bezel region BZA. The transmission region TA may overlap at least a part of the active region AA of the display module DM. The transmission region TA may be an optically transparent region. In an embodiment, for example, the transmission region TA may have a transmittance of about 90% or more with respect to light having a wavelength in a visible light range. The image IM may be provided to a user through the transmission region TA, and the user may receive information through the image IM.

The bezel region BZA may be a region having a relatively lower transmittance than the transmission region TA. The bezel region BZA may define the shape of the transmission region TA. The bezel region BZA may have a predetermined color. The bezel region BZA may cover the peripheral region NAA of the display module DM to block the peripheral region NAA from being viewed from the outside. However, this is merely an example, and alternatively, the bezel region BZA may be omitted in the window WM.

Figure 3:
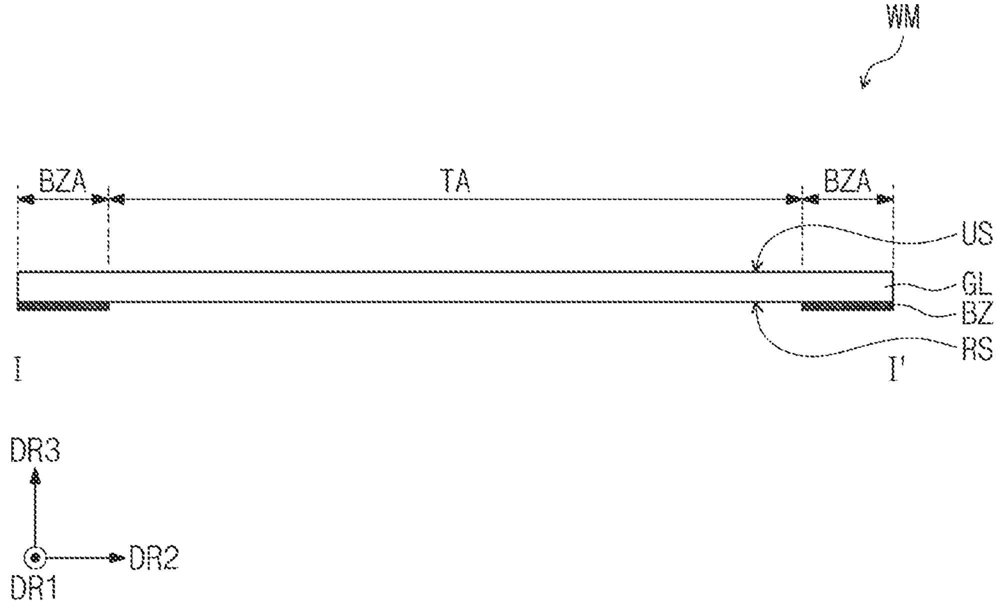
FIG. 3 is a cross-sectional view of a window according to an embodiment of the invention.

FIG. 3 is a cross-sectional view of a window WM according to an embodiment of the invention. FIG. 3 may be a cross-sectional view taken along line I-I' of the window WM of the display device DD shown in FIG. 2.

Referring to FIG. 3, the window WM according to an embodiment may include a glass substrate GL. The glass substrate GL may be a glass substrate GL chemically strengthened by being manufactured through a window WM manufacturing method according to an embodiment to be described later.

The glass substrate GL according to an embodiment may include an upper surface US and a lower surface RS. The upper surface US and the lower surface RS of the glass substrate GL may be opposed to each other, and a normal direction to each of the upper surface US and the lower surface RS may be parallel to the third direction DR3. The upper surface US of the glass substrate GL may be exposed to the outside of the display device DD.

The window WM may further include a printing layer BZ disposed on the lower surface RS of the glass substrate GL. The printing layer BZ may be formed on the lower surface RS of the glass substrate GL through a printing or a deposition process, and may be disposed directly on the lower surface RS of the glass substrate GL.

The printing layer BZ may be disposed under at least a part of the lower surface RS of the glass substrate GL to define the bezel region BZA. The printing layer BZ may be a part corresponding to the peripheral region NAA (see FIG. 2) of the display module DM (see FIG. 2).

The printing layer BZ may have a relatively lower transmittance than the glass substrate GL. In an embodiment, for example, the printing layer BZ may have a predetermined color. Accordingly, the printing layer BZ may selectively transmit or reflect only light having a specific color. Alternatively, the printing layer BZ may be a light blocking layer that absorbs incident light. The transmittance and the color of the printing layer BZ may be variously provided based on the types and shapes of the display device DD.

Figure 4:
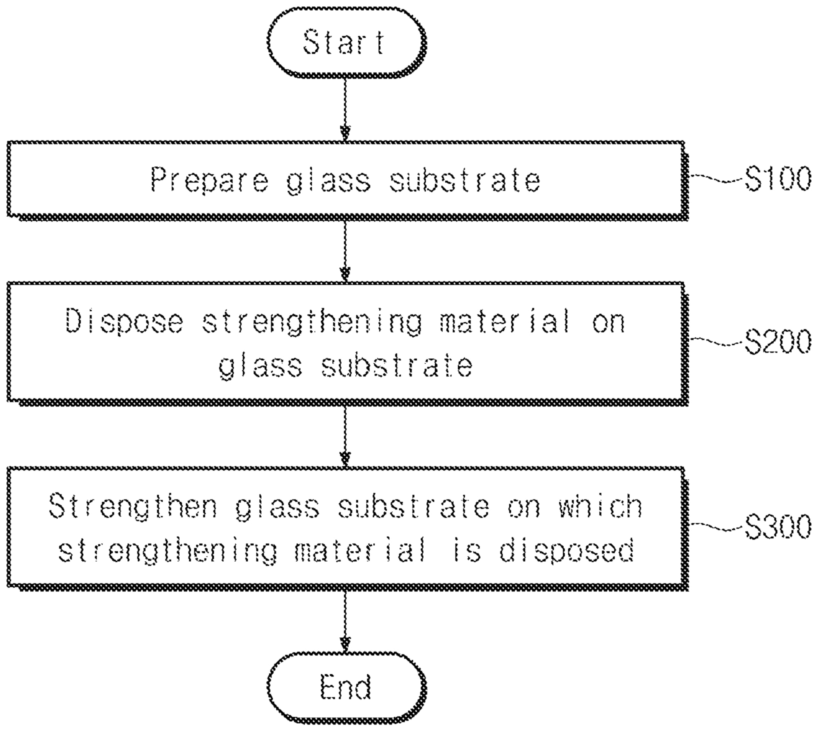
FIG. 4 is a flowchart illustrating a window manufacturing method according to an embodiment of the invention.
Figure 5A:
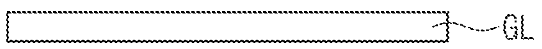
FIGS. 5A to 5C are diagrams schematically illustrating respective operations of a window manufacturing method according to an embodiment of the invention.
Figure 5B:
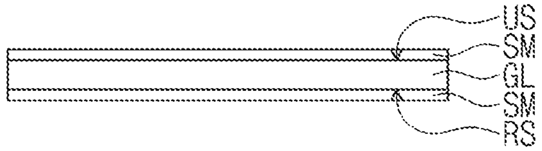
Figure 5C:
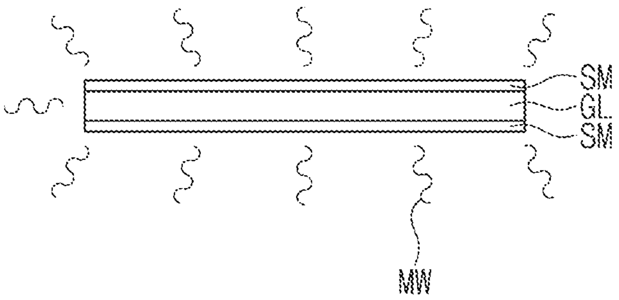
Figure 6:
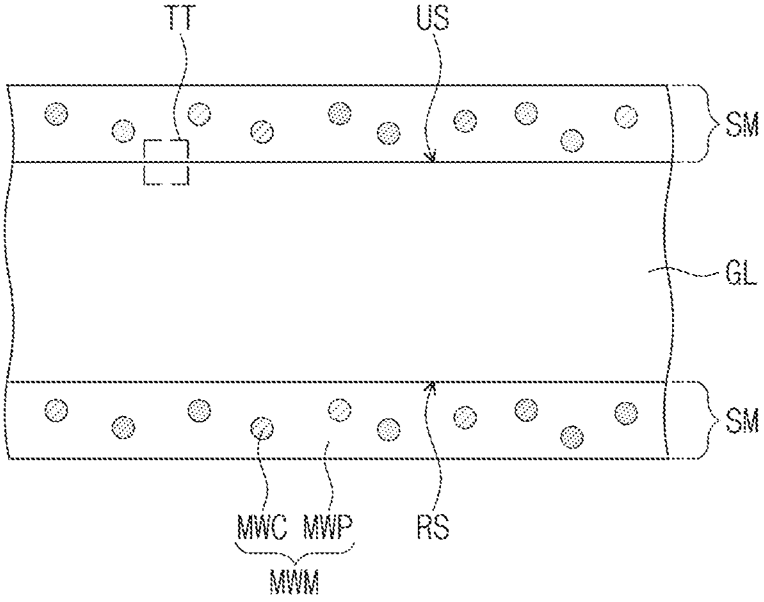
FIG. 6 is a diagram schematically illustrating an operation of a window manufacturing method according to an embodiment of the invention.
Figure 7A:
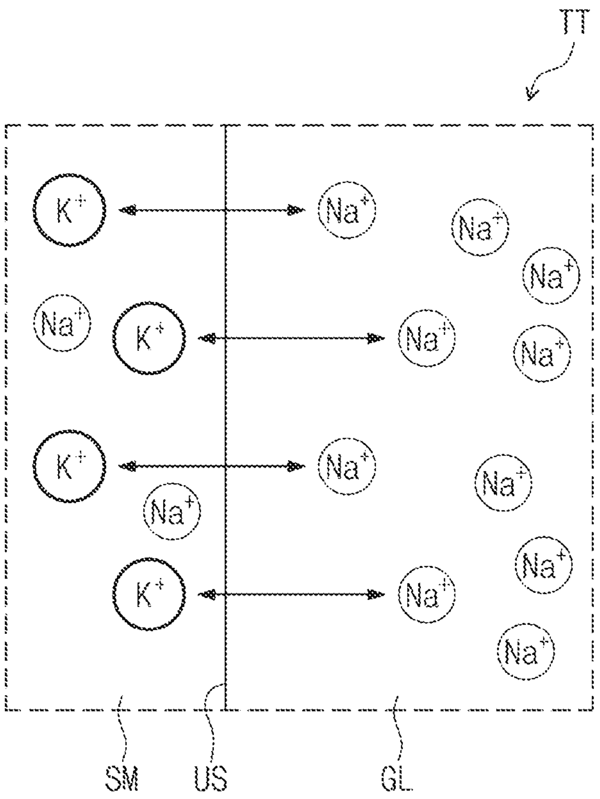
FIGS. 7A and 7B are diagrams schematically illustrating some operations of a window manufacturing method according to an embodiment of the invention.
Figure 7B:
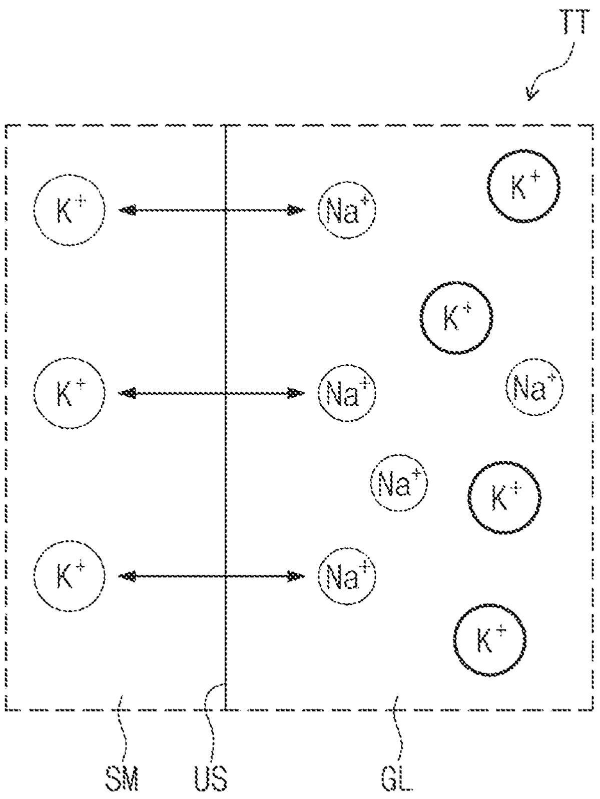

FIG. 4 is a flowchart illustrating a window WM manufacturing method according to an embodiment of the invention. FIGS. 5A to 5C are diagrams schematically illustrating respective operations of the window WM manufacturing method according to an embodiment of the invention. FIG. 6 is a diagram schematically illustrating an operation of the window WM manufacturing method according to an embodiment of the invention. FIGS. 7A and 7B are diagrams schematically illustrating some operations of the window WM manufacturing method according to an embodiment of the invention.

Referring to FIG. 4, the window WM manufacturing method according to an embodiment includes an operation (S100) of preparing a glass substrate GL, an operation (S200) of providing (disposing or forming) a strengthening material SM on the glass substrate GL, and an operation (S300) of strengthening the glass substrate GL.

FIG. 5A is a diagram schematically illustrating the operation (S100, see FIG. 4) of preparing a glass substrate GL. The glass substrate GL according to an embodiment may include alkali ions. In an embodiment, for example, the glass substrate GL may include at least one selected from a lithium ion ($Li^+$), a sodium ion ($Na^+$), and a potassium ion ($K^+$).

FIG. 5B is a diagram schematically illustrating the operation (S200, see FIG. 4) of providing a strengthening material SM on the glass substrate GL. FIG. 5B illustrates an embodiment where the strengthening material SM is provided on the entire surface of each of the upper surface US and the lower surface RS of the glass substrate GL, but not being limited thereto. Alternatively, the strengthening material SM is provided on the surface (e.g., an entire portion of one surface or a partial portion of one surface) of the glass substrate GL. In an embodiment, for example, the strengthening material SM may be provided on only one selected from the entire upper surface US and the entire lower surface RS of the glass substrate GL, or only on a partial portion of each of the upper surface US and/or the lower surface RS of the glass substrate GL. In an embodiment, the strengthening material SM may be provided on a side surface of the glass substrate GL, without being limited to the upper surface US and the lower surface RS of the glass substrate GL.

The strengthening material SM includes a salt including ion exchange target ions to be ion-exchanged (i.e., ion-exchangeable or capable of being ion-exchanged) with alkali ions included in the glass substrate GL, and high-frequency reactive material MWM (see FIG. 6).

The ion exchange target ions of the salt included in the strengthening material SM may be ions having a same monovalence as alkali ions, and having a greater ionic radius than the alkali ions. In an embodiment, for example, the alkali ions included in the glass substrate GL may include at least one selected from a sodium ion ($Na^+$), a potassium ion ($K^+$), a rubidium ion ($Rb^+$), and a cesium ion ($Cs^+$). In an embodiment, where the alkali ions included in the glass substrate GL are lithium ions ($Li^+$), the ion exchange target ions may be sodium ions ($Na^+$). In an embodiment, where the alkali ions included in the glass substrate GL are sodium ions ($Na^+$), the ion exchange target ions may be potassium ions ($K^+$). Ion exchange will be described later in detail.

The high-frequency reactive material MWM included in the strengthening material SM may be a material that generates heat in response to the high-frequency waves when irradiated with high-frequency waves.

FIG. 6 is an enlarged view of a part of FIGS. 5B and 5C. Referring to FIGS. 5B and 6 together, the high-frequency reactive material MWM included in the strengthening material SM may include high-frequency reactive ceramic MWC. The high-frequency reactive ceramic MWC may be ceramic that generates heat in response to high-frequency waves when irradiated with high-frequency waves.

In an embodiment, for example, the high-frequency reactive ceramic MWC may include at least one selected from $Al_2O_3$, $ZrO_2$, $TiO_2$, $Co_2O_3$, $MnO_2$, NiO, CuO, MgO, $SiO_2$, high-frequency reactive glass, dielectric ceramic expressed as $ABO_3$, SiC, and doped Si. In the dielectric ceramic expressed as $ABO_3$, A may be at least one selected from Ca, La, Sr, Ba, and Mg, and B may be at least one selected from Zn, Al, and Ti. A and B each include one type of element, or at least two types of elements.

In an embodiment, for example, the high-frequency reactive ceramic MWC may include SiC, doped Si, or a mixture of SiC and doped Si. SiC and doped Si are highly reactive with high-frequency waves, and thus when the high-frequency reactive material MWM includes SiC, doped Si, or a mixture of SiC and doped Si, heat generation efficiency of the strengthening material SM may become substantially great. Doped Si may be n-type doped, or p-type doped.

Referring to FIGS. 5B and 6 together, the high-frequency reactive material MWM included in the strengthening material SM may further include a polymer MWP reactive with high-frequency waves. In an embodiment, for example, the polymer MWP reactive with high-frequency waves may include at least one selected from acrylonitrile butadiene styrene (ABS) copolymer, acetal, epoxy, melamine, phenylformaldehyde, polycarbonate, polyester, polyamide, polyurethane, polyvinyl chloride (PVC), thermoplastic elastomer (TPE), and silicon (Si).

FIG. 6 illustrates an embodiment where the strengthening material SM includes a polymer MWP reactive with high-frequency waves, but this is merely an example, and alternatively, the polymer MWP reactive with high-frequency waves may be omitted. In an embodiment, for example, where the strengthening material SM has a form of slurry to be applied on the surface of the glass substrate GL through spraying, the strengthening material SM may not include the polymer MWP reactive with high-frequency waves.

The strengthening material SM according to an embodiment may have a form of slurry, paste, or a sheet. In an embodiment, the strengthening material SM having a form of slurry may be applied on the glass substrate GL through spraying, the strengthening material SM having a form of paste may be applied on the glass substrate GL in a viscous state, and the strengthening material SM having a form of a sheet may be disposed directly on the glass substrate GL.

In such an embodiment, the operation (S200, see FIG. 4) of providing the strengthening material SM on the glass substrate GL may be performed in a non-immersion manner. Accordingly, the strengthening material SM may be disposed on the glass substrate GL by easily controlling the concentration of a salt including ion exchange target ions, and the concentration of the high-frequency reactive material MWM. In addition, as described above, the strengthening material SM may be selectively disposed on a part of the surface of the glass substrate GL.

The strengthening material SM according to an embodiment may further include at least one selected from a viscosity modifier for adjusting the viscosity thereof, and a dispersant for inducing dispersion.

FIG. 5C is a diagram schematically illustrating the operation (S300, see FIG. 4) of strengthening the glass substrate GL on which the strengthening material SM is disposed. The operation (S300, see FIG. 4) of strengthening the glass substrate GL includes an operation of irradiating, with high-frequency waves MW, the strengthening material SM disposed on the glass substrate GL. The operation (S300, see FIG. 4) of irradiating the strengthening material SM with high-frequency waves may include an operation of generating, by the high-frequency reactive material MWM (see FIG. 6), heat in the strengthening material SM in response to the high-frequency waves MW.

The frequency of the high-frequency waves MW with which the strengthening material SM is irradiated may be a frequency at which the high-frequency reactive material MWM (see FIG. 6) included in the strengthening material SM is reactive to generate heat. In an embodiment, for example, the strengthening material SM disposed on the glass substrate GL may be irradiated with the high-frequency waves MW having a fixed frequency of about 2.45 GHz.

In an alternative embodiment, a variable frequency microwave (VFM) having a variable frequency of about 5.85 GHz to about 6.5 GHz may be used. The high-frequency waves MW may be more uniformly transferred to the high-frequency reactive material MWM included in the strengthening material SM disposed on the glass substrate GL in a case where the variable frequency microwave (VFM) is used, than a case where the high-frequency waves MW having a fixed frequency is used. Accordingly, in such an embodiment, the heat generation efficiency of the strengthening material SM may be further improved.

FIGS. 7A and 7B are enlarged views of a part taken along region TT in FIG. 6. The operation (S300, see FIG. 4) of strengthening the glass substrate GL according to an embodiment may further include an operation of ion-exchanging the alkali ions included in the glass substrate GL and the ion exchange target ions included in the strengthening material SM, which is described above. FIGS. 7A and 7B exemplarily illustrate that sodium ions ($Na^+$) and potassium ion ($K^+$) are ion-exchanged with each other.

FIG. 7A is a diagram schematically illustrating a state of ions in an operation of irradiating the strengthening material SM disposed on the glass substrate GL with the high-frequency waves MW shown in FIG. 5C.

Referring to FIG. 7A, the glass substrate GL may include sodium ions ($Na^+$), and the strengthening material SM may include potassium ions ($K^+$) having a larger ionic radius than sodium ions ($Na^+$). When the strengthening material SM is irradiated with the high-frequency waves MW (see FIG. 5C), the high-frequency reactive material MWM (see FIG. 6) reacts with the high-frequency waves MW to generate heat. As illustrated in FIG. 7A, the generated heat may cause sodium ions ($Na^+$) existing on the surface of the glass substrate GL and potassium ions ($K^+$) existing on the surface of the strengthening material SM to be ion-exchanged with each other due to the inter-ion concentration gradient.

FIG. 7B illustrates a state after the operation in FIG. 7A of ion-exchanging the alkali ions and the ion exchange target ions.

As shown in FIG. 7B, some sodium ions ($Na^+$) existing on the surface of the glass substrate GL are exchanged with potassium ions ($K^+$) having a larger ionic radius than sodium ions ($Na^+$), and therefore a compressive stress may be formed, thereby chemically strengthening the glass substrate GL.

In an embodiment, as described above, since the strengthening material SM including the high-frequency reactive material MWM (see FIG. 6) is used, the glass substrate GL may be strengthened without being subjected to heat-treatment at a high temperature (about 400° C. or higher). Here, the wording, "heat-treatment" may mean conductive heat added from the outside. Accordingly, since the glass substrate GL may be strengthened with low energy, processability may be improved, and a high compressive stress and a wide strengthening range may be obtained even at a low temperature.

In such an embodiment, since the strengthening material SM may uniformly generate heat when the strengthening material SM including the high-frequency reactive material MWM (see FIG. 6) is irradiated with high-frequency waves MW, the surface of the glass substrate GL may be uniformly strengthened.

In an embodiment, the operation (S300, see FIG. 4) of strengthening the glass substrate GL may be performed in a non-immersion manner. Accordingly, as described above, when the strengthening material SM is partially disposed on a portion of the surface of the glass substrate GL, the portion of the surface of the glass substrate GL may be selectively strengthened. In such an embodiment, the concentration of the ion exchange target ions included in the strengthening material SM is easily controlled, and thus the degree of strengthening the glass substrate GL may be controlled.

The window WM manufacturing method according to an embodiment may further include an operation of removing the strengthening material SM from the glass substrate GL the surface of which is strengthened, after the operation (S300, see FIG. 4) of strengthening the glass substrate GL on which the strengthening material SM is disposed.

According to an embodiment of the invention described above, the window WM including the glass substrate GL, the surface of which is strengthened, may be manufactured.

Figure 8:
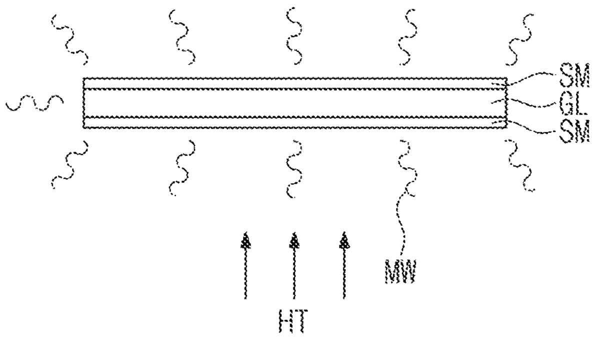
FIG. 8 is a diagram schematically illustrating an operation of a window manufacturing method according to an embodiment of the invention.

FIG. 8 is a diagram schematically illustrating an operation of a window WM manufacturing method according to an embodiment of the invention.

Referring to FIG. 8, the operation (S300, see FIG. 4) of strengthening the glass substrate GL on which the strengthening material SM is disposed may further include operations of irradiating the strengthening material SM disposed on the glass substrate GL with the high-frequency waves MW, and simultaneously applying conductive heat, from the outside, to the glass substrate and the strengthening material disposed on the glass substrate.

As in FIG. 5C, the heat generated by the strengthening material SM disposed on the glass substrate GL may be partially lost by the surroundings. Accordingly, in such an embodiment where conduction heat HT is applied from the outside to the glass substrate GL and the strengthening material SM disposed on the glass substrate GL, heat may be effectively prevented from being lost to the surroundings. In addition, when the strengthening material SM is irradiated with the high-frequency waves MW at a higher temperature, the high-frequency reactive material MWM may become more highly reactive with the high-frequency waves MW. Accordingly, the efficiency of strengthening the glass substrate GL may be further improved.

Figure 9:
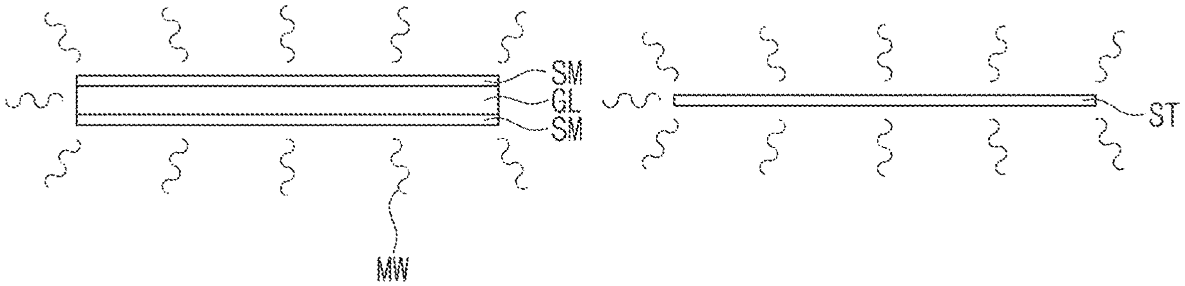
FIG. 9 is a diagram schematically illustrating an operation of a window manufacturing method according to an embodiment of the invention.

FIG. 9 is a diagram schematically illustrating an operation of a window WM manufacturing method according to an embodiment of the invention. The window WM manufacturing method according to an embodiment may further include an operation of providing a high-frequency susceptor ST to be adjacent to (e.g., next to or close to) the glass substrate GL and the strengthening material SM disposed on the glass substrate GL.

Referring to FIG. 9, the operation (S300, see FIG. 4) of strengthening the glass substrate GL on which the strengthening material SM is disposed may further include operations of irradiating the high-frequency susceptor ST with high-frequency waves MW, and simultaneously irradiating the strengthening material SM disposed on the glass substrate GL with the high-frequency waves MW. In the operation of irradiating the high-frequency susceptor ST with the high-frequency waves MW, the high-frequency susceptor ST may generate heat in response to the high-frequency waves MW.

The high-frequency susceptor ST may generate heat in response to the high-frequency waves MW. Accordingly, the ambient temperature of the glass substrate GL on which the strengthening material SM is disposed may be raised. As described above in FIG. 8, since heat-loss to the surroundings may be effectively prevented, and the high-frequency reactive material MWM (see FIG. 6) may become more highly reactive with the high-frequency waves MW, the strengthening efficiency of the glass substrate GL may become higher.

Figure 10A:
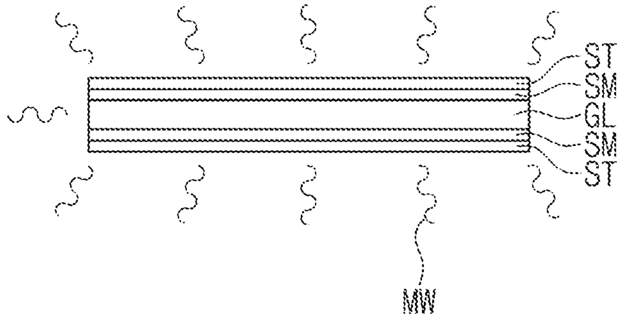
FIGS. 10 to 10C are diagrams schematically illustrating operations of a window manufacturing method according to an embodiment of the invention.
Figure 10B:
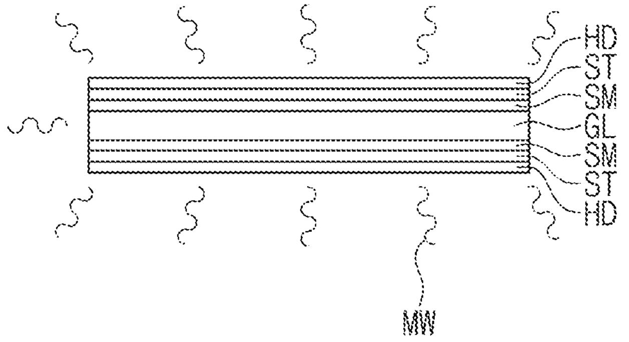
Figure 10C:
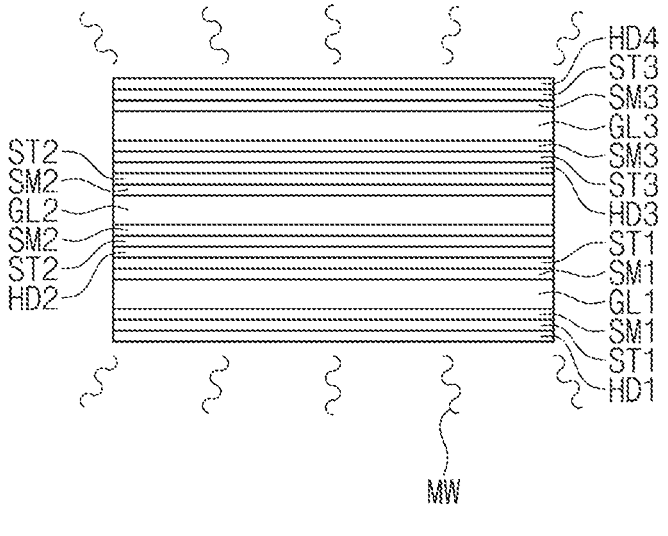

FIGS. 10A to 10C are diagrams schematically illustrating operations of a window manufacturing method according to an embodiment of the invention.

Referring to FIGS. 10A to 10C, the window WM manufacturing method according to an embodiment may further include an operation of providing the high-frequency susceptor ST directly on the strengthening material SM disposed on the glass substrate GL.

Referring to FIG. 10A, in the window WM manufacturing method according to an embodiment, the operation (S300, see FIG. 4) of strengthening the glass substrate GL on which the strengthening material SM is disposed may further include operations of irradiating the high-frequency susceptor ST with the high-frequency waves MW, and simultaneously irradiating the strengthening material SM disposed on the glass substrate GL with the high-frequency waves MW. In the operation of irradiating the high-frequency susceptor ST with the high-frequency waves MW, the high-frequency susceptor ST may generate heat in response to the high-frequency waves MW. Accordingly, the glass substrate GL and the strengthening material SM may receive more heat, that is, the heat generated by the high-frequency susceptor ST as well as the heat generated by the high-frequency reactive material MWM (see FIG. 6) included in the strengthening material SM. Accordingly, the efficiency of strengthening the glass substrate GL may become higher.

Referring to FIG. 10B, the window WM manufacturing method according to an embodiment may further include an operation of providing a heat-loss preventing material HD directly on the high-frequency susceptor ST. Since the heat-loss preventing material HD is provided on the high-frequency susceptor ST, the heat generated by the strengthening material SM and the high-frequency susceptor ST may be further prevented from being lost to the surroundings. Accordingly, the efficiency of strengthening the glass substrate GL may become higher.

In the window WM manufacturing method according to an embodiment, the strengthening material SM may be disposed between the respective glass substrates GL. In addition, the high-frequency susceptor ST and/or the heat-loss preventing material HD may be further disposed between the respective glass substrates GL.

In an embodiment, for example, as in FIG. 10C, strengthening materials SM1, SM2, and SM3, high-frequency susceptors ST1, ST2, and ST3, and heat-loss preventing materials HD1, HD2, HD3, and HD4 may be respectively disposed on a plurality of glass substrates GL1, GL2, and GL3. Accordingly, the plurality of glass substrates GL1, GL2, and GL3 may be simultaneously strengthened.

Since embodiments of the window WM manufacturing method according to the invention use the strengthening material SM including the high-frequency reactive material MWM, the glass substrate GL may be strengthened without being subjected to heat-treatment at a high temperature.

In such embodiments, since the window WM manufacturing method includes irradiating the strengthening material SM including the high-frequency reactive material MWM with the high-frequency waves MW, the strengthening material SM may uniformly generate heat, and thus the surface of the glass substrate GL may be uniformly strengthened.

Accordingly, in such embodiments, the window WM manufacturing method may effectively chemically strengthen the glass substrate GL used for the window WM.

According to embodiments of the invention, as described above, a window manufacturing method may include an operation of strengthening a glass substrate by using a strengthening material including a high-frequency reactive material, thereby effectively chemically strengthening the glass substrate used for a window.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A window manufacturing method comprising:

preparing a glass substrate including alkali ions;

providing a strengthening material on a surface of the glass substrate; and strengthening the surface of the glass substrate, wherein the strengthening the surface of the glass substrate includes irradiating the strengthening material disposed on the glass substrate with high-frequency waves, and the strengthening material includes a salt including ion exchange target ions, which are ion-exchangeable with the alkali ions included in the glass substrate, and a high-frequency reactive material, wherein the high-frequency reactive material comprises high-frequency reactive ceramic, and wherein the high-frequency reactive ceramic comprises doped Si.

2. The window manufacturing method of claim 1, wherein the strengthening the surface of the glass substrate further comprises ion-exchanging the alkali ions and the ion exchange target ions with each other.

3. The window manufacturing method of claim 1, wherein the irradiating the strengthening material with high-frequency waves comprises generating, by the high-frequency reactive material, heat in response to the high-frequency waves.

4. The window manufacturing method of claim 1, wherein the high-frequency reactive ceramic further comprises SiC.

5. The window manufacturing method of claim 1, wherein the high-frequency reactive material further comprises a high-frequency reactive polymer.

6. The window manufacturing method of claim 5, wherein the high-frequency reactive polymer comprises at least one selected from acrylonitrile butadiene styrene (ABS) copolymer, acetal, epoxy, melamine, phenylformaldehyde, polycarbonate, polyester, polyamide, polyurethane, polyvinyl chloride (PVC), thermoplastic elastomer (TPE), and silicon (Si).

7. The window manufacturing method of claim 1, wherein the strengthening material has a form of slurry, paste, or a sheet.

8. The window manufacturing method of claim 1, wherein the providing the strengthening material, and the strengthening the surface of the glass substrate are each performed in a non-immersion manner.

9. The window manufacturing method of claim 1, further comprising:

removing the strengthening material from the glass substrate, the surface of which is strengthened.

10. The window manufacturing method of claim 1, wherein the strengthening the surface of the glass substrate further comprises applying conductive heat, from an outside, to the glass substrate and the strengthening material disposed on the glass substrate, simultaneously with the irradiating the strengthening material with high-frequency waves.

11. The window manufacturing method of claim 1, further comprising providing a high-frequency susceptor to be adjacent to the glass substrate and the strengthening material disposed on the glass substrate, wherein the strengthening further includes irradiating the high-frequency susceptor with high-frequency waves, simultaneously with the irradiating the strengthening material disposed on the glass substrate with high-frequency waves, and the high-frequency susceptor generates heat in response to the high-frequency waves radiated thereto.

12. The window manufacturing method of claim 1, further comprising providing a high-frequency susceptor directly on the strengthening material disposed on the glass substrate, wherein the strengthening further includes irradiating the high-frequency susceptor with high-frequency waves, simultaneously with the irradiating the strengthening material disposed on the glass substrate with high-frequency waves, and the high-frequency susceptor generates heat in response to the high-frequency waves radiated thereto.

13. The window manufacturing method of claim 12, further comprising:

providing a heat-loss preventing material directly on the high-frequency susceptor.

14. A window manufacturing method comprising:

preparing a glass substrate;

providing a strengthening material including a high-frequency reactive material on a surface of the glass substrate; and strengthening the surface of the glass substrate by irradiating the strengthening material disposed on the glass substrate with high-frequency waves, wherein the high-frequency reactive material comprises doped Si.

15. The window manufacturing method of claim 14, wherein the strengthening the surface of the glass substrate comprises generating, by the high-frequency reactive material, heat in response to the high-frequency waves.

16. The window manufacturing method of claim 14, wherein the high-frequency reactive material further comprises SiC.

17. A window manufacturing method comprising:

preparing a glass substrate;

providing a strengthening material including a high-frequency reactive material on a surface of the glass substrate; and strengthening the glass substrate by irradiating the strengthening material disposed on the glass substrate with high-frequency waves, wherein the high-frequency reactive material includes high-frequency reactive ceramic, the high-frequency reactive ceramic includes doped Si.

18. The window manufacturing method of claim 17, wherein the strengthening material further comprises a high-frequency reactive polymer, and the polymer includes at least one selected from acrylonitrile butadiene styrene copolymer (ABS), acetal, epoxy, melamine, phenylformaldehyde, polycarbonate, polyester, polyamide, polyurethane, polyvinyl chloride (PVC), thermoplastic elastomer (TPE), and silicon (Si).

* * * * *